United States Patent [19]
Lutz

[11] Patent Number: 5,810,327
[45] Date of Patent: Sep. 22, 1998

[54] SHUTOFF VALVE WITH SPRING-LOADED VALVE DISK

[75] Inventor: Jürgen Lutz, Bremen, Germany

[73] Assignee: Gestra GmbH, Bremen, Germany

[21] Appl. No.: 615,808

[22] Filed: Mar. 14, 1996

[30] Foreign Application Priority Data

Mar. 30, 1995 [DE] Germany ........................ 195 11 756.5

[51] Int. Cl.⁶ .............................. F16K 31/56; F16K 1/20
[52] U.S. Cl. ........................... 251/75; 251/144; 251/303; 16/110 R
[58] Field of Search .............................. 251/75, 144, 303, 251/313; 16/110 R, 111 R, 112, 114 R, 121

[56] References Cited

U.S. PATENT DOCUMENTS

| | | | |
|---|---|---|---|
| 1,304,519 | 5/1919 | Walker | 251/303 X |
| 1,560,902 | 11/1925 | Eckert et al. | 251/144 |
| 1,574,959 | 3/1926 | Dearing | 251/75 |
| 1,637,761 | 8/1927 | Butler | 251/75 |
| 1,706,700 | 3/1929 | Linendoll | 251/303 X |
| 1,783,621 | 12/1930 | Johnson | 251/144 |
| 1,804,599 | 5/1931 | Edel | 251/75 X |
| 1,989,083 | 1/1935 | Dahnken et al. | 16/121 X |
| 3,176,719 | 4/1965 | Nord et al. | 251/75 X |
| 4,595,032 | 6/1986 | Banks | 251/75 X |
| 4,890,814 | 1/1990 | Thomas | 251/144 X |

FOREIGN PATENT DOCUMENTS

| | | |
|---|---|---|
| 0 430 664 A1 | 11/1990 | European Pat. Off. . |
| 834168 | 7/1949 | Germany . |

*Primary Examiner*—John Rivell
*Attorney, Agent, or Firm*—Collard & Roe, P. C.

[57] ABSTRACT

A shutoff valve with a spring-loaded valve disk. The spring, designed as a tension or pressure spring is arranged outside of the valve housing, where a pivoting arm is attached to the actuating shaft. One end of the arm remote from the shaft is engaged by the spring. The other end of the spring is supported on an abutment mounted on the outside of the valve housing. The driver and the abutment are arranged in such a way that in the closed position, an imaginary connection line extends between the abutment and the driver with a lateral displacement transverse to the longitudinal shaft axis extending in the direction of closing the valve. The operational state of the spring is always visible so that a damage or defect can be readily identified.

10 Claims, 5 Drawing Sheets

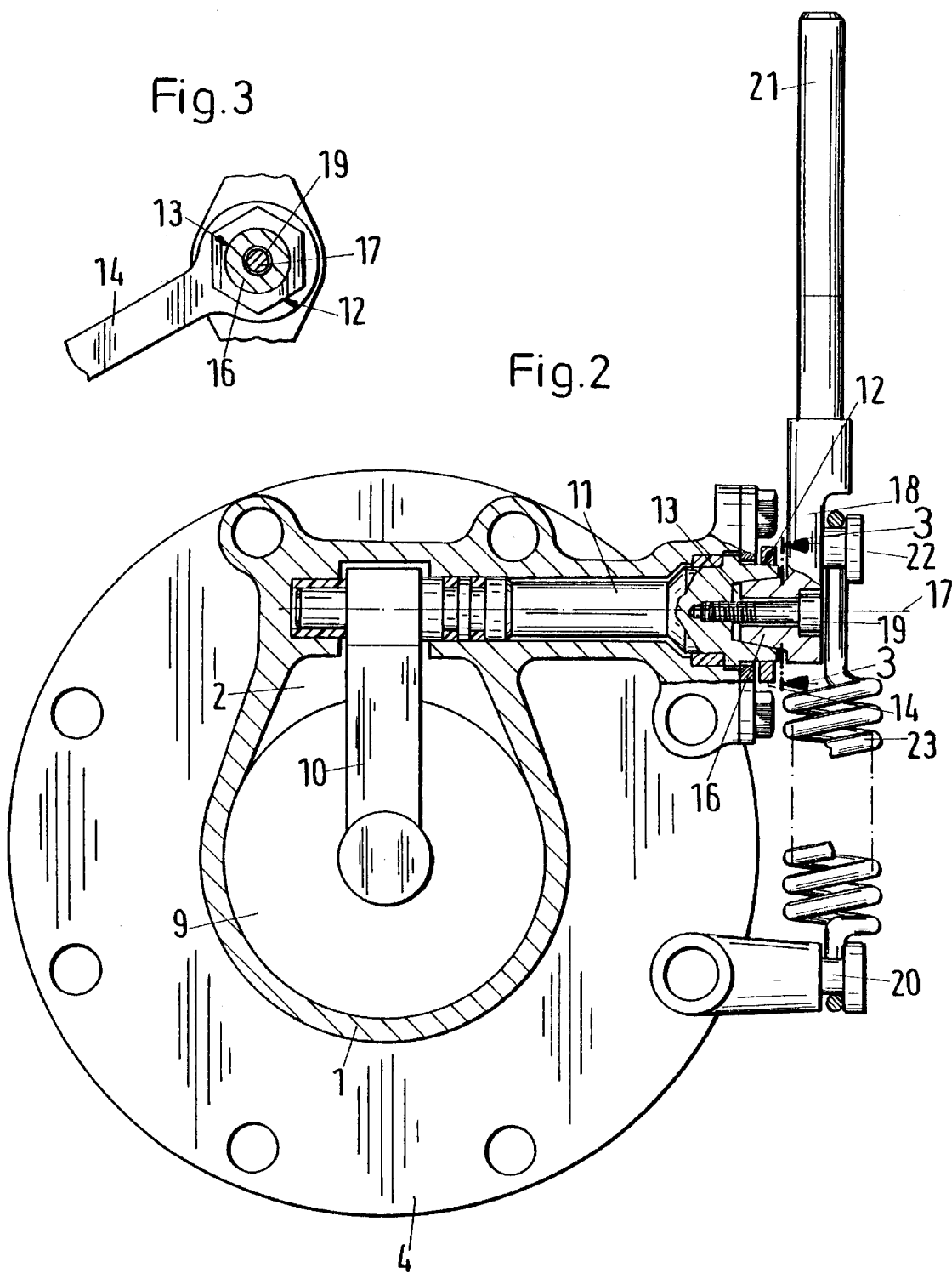

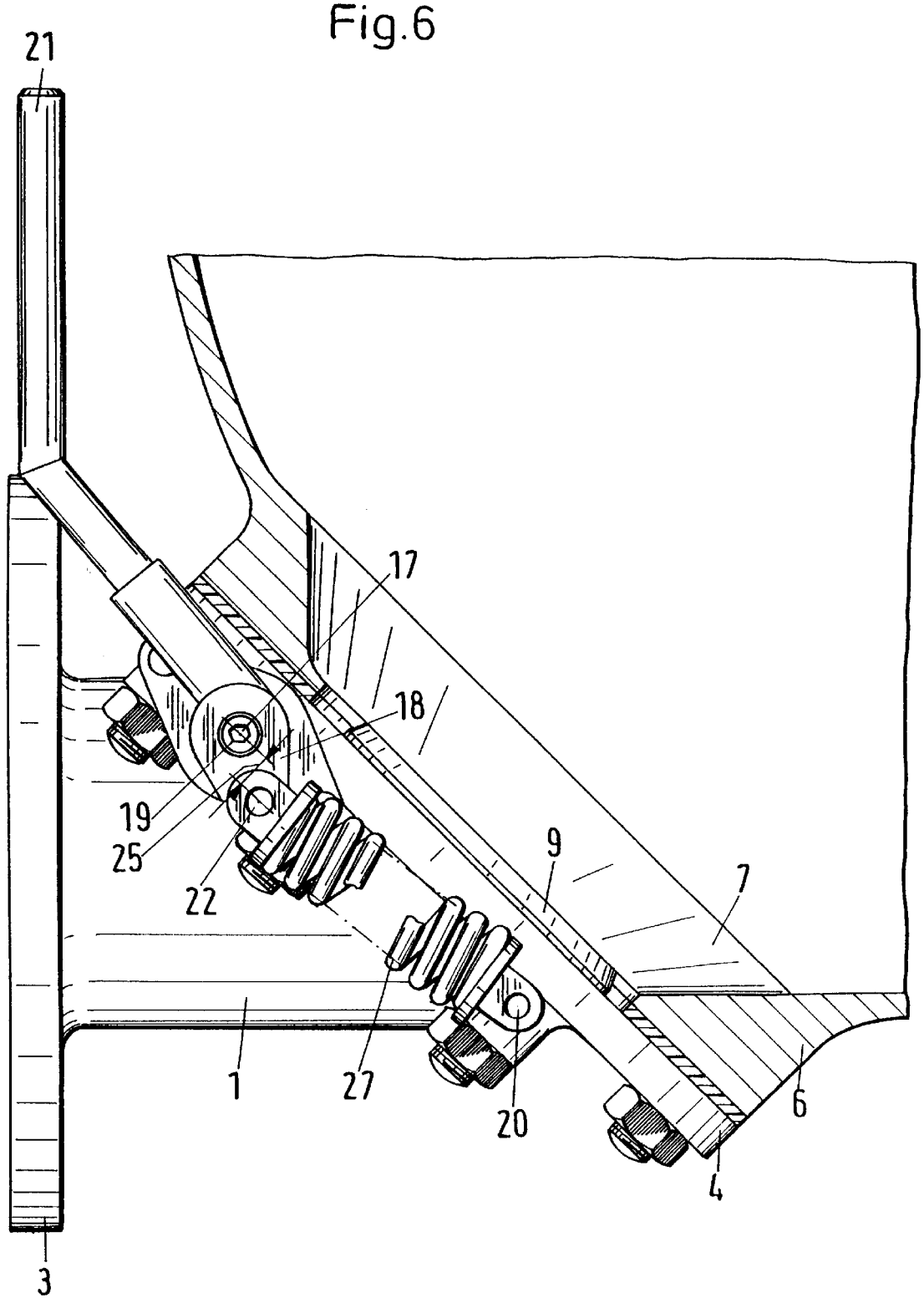

SHUTOFF VALVE WITH SPRING-LOADED VALVE DISK

BACKGROUND OF THE INVENTION

1. Field of the Invention

The invention relates to a shutoff valve with a spring-loaded valve disk. More particularly, it relates to a shutoff valve having an actuating shaft for the valve disk which penetrates the wall of the valve housing.

2. The Prior Art

Shutoff valves are often used for sealing the filling and/or draining openings of containers. Such containers may be stationary or transport containers such as, for example, railway tank cars, tank trucks, or tank containers.

Such a known shutoff valve is shown in German Patent DE-PS 834 168 which has a hollow actuation valve. A spring is mounted for use as a torsion member. A force exerted on the actuating lever is transmitted by the spring to the actuating shaft and the valve disk, which is rigidly joined with the shaft. The spring determines the maximum force applicable to the valve disk. A higher force, as required, for example, to overcome any additional resistance that may occur during opening or closing, cannot be exerted with the known shutoff valve. In order to keep the shutoff valve closed, a separate locking mechanism is required on the actuating lever. If any leakage occurs on the hollow actuating shaft, the stored medium spills from the valve housing onto the spring, which cannot be detected from the outside. Corrosive medium may cause damage to the spring. Such damage as well as other defects of the spring are not visible from the outside, which constitutes an important drawback especially with respect to the functional safety.

A similar shutoff valve is known from European Patent EP-OS 430 664, in which the actuating lever and the actuating shaft are directly connected with each other, so that a high actuating force may be applied to the valve disk. The spring designed as a torsion member is accommodated in a special, closed chamber of the valve housing, into which the actuating shaft projects. If the seal around the shaft is defective, the stored medium penetrates into the separate chamber and contacts the spring. With this shutoff valve it is not possible to inspect the condition of the spring from the outside, which also presents a drawback with respect to functional safety. Furthermore, the chamber required for the spring results in a highly irregular shape of the valve housing.

SUMMARY OF THE INVENTION

It is therefore an object of the present invention to overcome the drawbacks of the prior art and to create a spring-loaded shutoff valve that is characterized by high functional safety.

It is a further object of the present invention to provide a shutoff valve where most of the components are located outside the valve housing effectively separated from contacting the stored medium.

These and other related objects are achieved according to the invention by a shutoff valve which includes a valve housing having a wall defining a flow-through duct with a valve seat and a pivoting valve disk cooperating with the valve seat to open and shut the shutoff valve. An actuating shaft with a longitudinal axis extends through the wall of the valve housing and is connected to the valve disk within the valve housing. A pivoting arm is mounted on the actuating shaft outside the valve housing and extends transversely to the longitudinal axis. The pivoting arm has an end remote from the actuating shaft with a driver disposed at the end. A stationary abutment is formed on an outer side of the valve housing. A spring for rotating the actuating shaft is connected to the stationary abutment and the driver outside the valve housing along a linear direction of movement that extends transverse to the longitudinal axis. An actuator is disposed outside of the valve housing which engages the actuating shaft for pivotal movement about the longitudinal axis. The driver and the abutment are positioned so that when the valve is shut a connecting line extends between the abutment and the driver which is laterally displaced from the longitudinal axis in the direction of shutting the valve.

The spring automatically maintains the valve disk in the closed portion. Furthermore, the spring is completely isolated from contacting the stored medium. Therefore, when selecting a suitable material for the spring, the corrosive effects of the stored medium need not be considered, so that the spring can be made from favorably-priced material and have a very long service life. The condition of the spring may be observed at any time, which provides a particularly high degree of operational safety. The spring is designed as a lifting element and is arranged externally of the housing thereby avoiding an exaggerated shape of the housing. The volume of the material in the valve housing and the weight of the shutoff valve can be very low, which is a significant advantage for certain applications, for example on tank containers.

The driver and the abutment are positioned so that when the valve is open, the connecting line is laterally displaced from the longitudinal axis in the direction of opening the valve. The spring maintains the valve disk not only in the closed position, but also in the open position. When the valve disk approaches the open position, the force applied by the spring to the valve disk via the actuating shaft is reversed so that the initial closing force becomes an opening force. The valve disk subsequently snaps into the open position where it is maintained by the spring. For closing the valve, the valve disk first has to be moved against the force of the spring, which is now acting in the opening direction, until the spring force again reverses and provides a closing force as the valve disk approaches the closed position. The valve disk subsequently snaps into the closed position where it is pressed by the spring against the valve seat to form a seal. A particularly advantageous embodiment results from having the end of the pivot arm extend away from the abutment with the spring exerting tension between the driver and the abutment. In an alternate advantageous embodiment, the end of the pivot arm extends toward the abutment and the spring is compressed between the driver and the abutment.

The shutoff valve further includes a first conical part comprising a conical pin and a second conical part comprising a complementary conical receiving bore. One conical part is disposed at an end of the actuating shaft outside of the valve housing and the other conical part is disposed on the pivoting arm. A clamping device, e.g. a screw, presses the conical parts into each other to secure the pivoting arm to the actuating shaft. The connection between conical parts allows transmission of the required actuating forces. At the same time, it permits a continuous range of relative adjustment between the actuating shaft and the pivoting arm which permits optimal positioning of the driver relative to the longitudinal axis of the shaft and the abutment. All manufacturing tolerances, relating to the angular position of the valve disk relative to the parts of the actuating mechanism, can be readily compensated for.

The actuator includes a lever mounted onto the pivoting arm for manual operation of the valve. The actuating shaft includes engagement surfaces outside of the valve housing. The engagement surfaces allow the actuating shaft to be maintained in the closed position by use of a hand tool, for example an adjustable wrench, during installation of the shutoff valve, when the pivot arm is moved into its desired position. The relative position of the two parts may be ideally set in this manner. Furthermore, the engagement surfaces permit emergency actuation of the shutoff valve, for example when the lever is damaged.

The valve comprises pivoting means mounted to the engagement surfaces. The pivoting arm is connected to the actuating shaft spaced from the valve housing with the engagement surfaces disposed between the valve housing and the pivoting arm. The actuating shaft does not project beyond the pivoting arm, so that the pivoting arm is capable of moving the spring without obstruction. Instead of using a wrench to temporarily engage the engagement surfaces, a lever may be permanently installed on the polyhedral. In addition to the functions mentioned above, the lever allows possible remote actuation of the shutoff valve, for example, to close the valve in an emergency via a rip cord connected to a lever.

The valve housing includes an end with a flange for connection to a container. The actuating shaft and the abutment are located close to the flange with the spring disposed laterally adjacent the flange. The valve seat is also located at the end of the valve housing. These features result in a valve housing where the volume of the material and the weight can be particularly low. All of the operating components of the shutoff valve are concentrated on the part of the housing which adjoins the container. Only in that region must the valve housing be designed to receive or support the operating components. The function of the remainder of the housing is limited to formation of the flow-through duct. The duct can be designed with very thin walls, so that a particularly lightweight valve housing is provided. Different structural lengths of the housing can be provided without requiring changes in the zone supporting the actuating mechanisms.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 2 is a partial cross-sectional view of the shutoff valve in the closed position, taken along the line 2—2 from FIG. 1;

FIG. 3 is a further cross-sectional view of the shutoff valve taken along the line 3—3 from FIG. 2;

FIG. 6 is a right side elevational view of a second embodiment of the shutoff valve in the closed position.

DETAILED DESCRIPTION OF THE PREFERRED EMBODIMENTS

Figure 1:
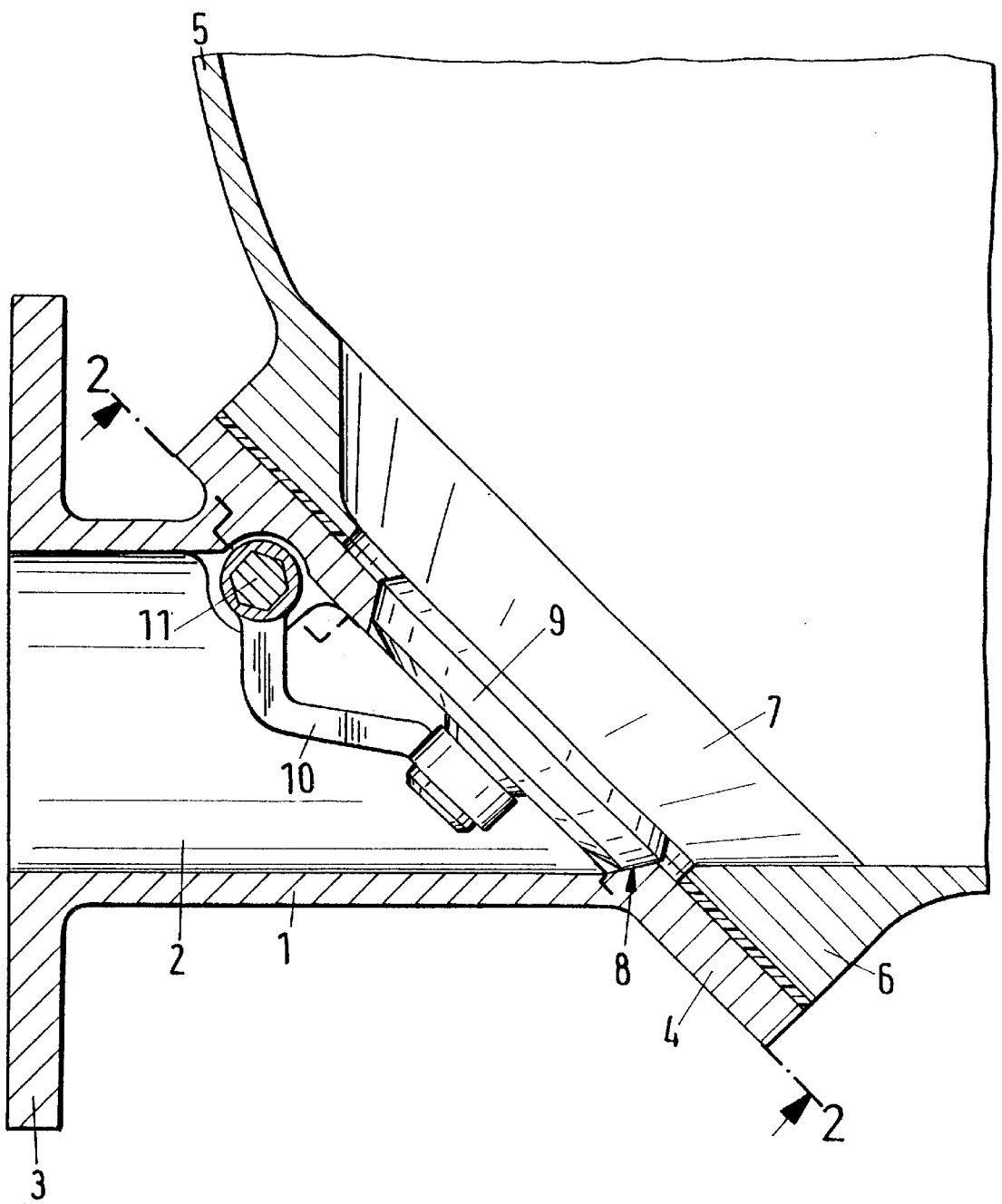
FIG. 1 is a longitudinal cross-sectional view of a valve housing showing a shutoff valve according to the invention, in the closed position.

Referring now in detail to the drawings and, in particular, FIG. 1, there is shown a shutoff valve within a valve housing 1, which is provided with a flow-through duct 2 having flanges 3 and 4 at the two ends of the duct. Flange 3 connects to a separate filling or draining conduit. Flange 4 attaches the shutoff valve to a partly-shown container 5 which has a connection flange 6 present in the lower part of the container, i.e. in the lateral zone of the container. Connection flange 6 has a filling and draining opening 7. At the end of the flow-through duct 2 on the container side, there is a valve seat 8 facing into container 5. Valve seat 8 cooperates with a valve disk 9 which swings into container 5 when the shutoff is valve opened. When valve disk 9 is closed, in addition to the closing force of a spring 23 the weight of the stored medium additionally helps to press the wedge-shaped valve disk 9 against valve seat 8 to tightly seal the valve. On its side facing away from container 5, valve disk 9 is connected to a pivoting lever 10, which is torsionally rigidly connected with an actuating shaft 11 within valve housing 1. Shaft 11 is rotatably supported within valve housing 1 and extends outwardly through the wall of valve housing 1.

The end of actuating shaft 11, located outside valve housing 1, is formed as a polyhedral 12, as can be seen in FIG. 3. Furthermore, the end of the actuating shaft is provided with an axially-extending conical receiving bore 13. One end of a closing lever 14 is placed on polyhedral 12. Closing lever 14 has an interior polyhedral complementing the exterior polyhedral of actuating shaft 11. The other end of lever 14 has an eye 15, which can be seen in FIG. 4. A conical pin 16 of a swivel arm 18, located outside of valve housing 1, projects into receiving bore 13 of actuating shaft 11. Pin 16 is shaped to match the bore. The conical parts 13 and 16 are firmly pressed into each other and secured together by a screw 19.

Figure 4:
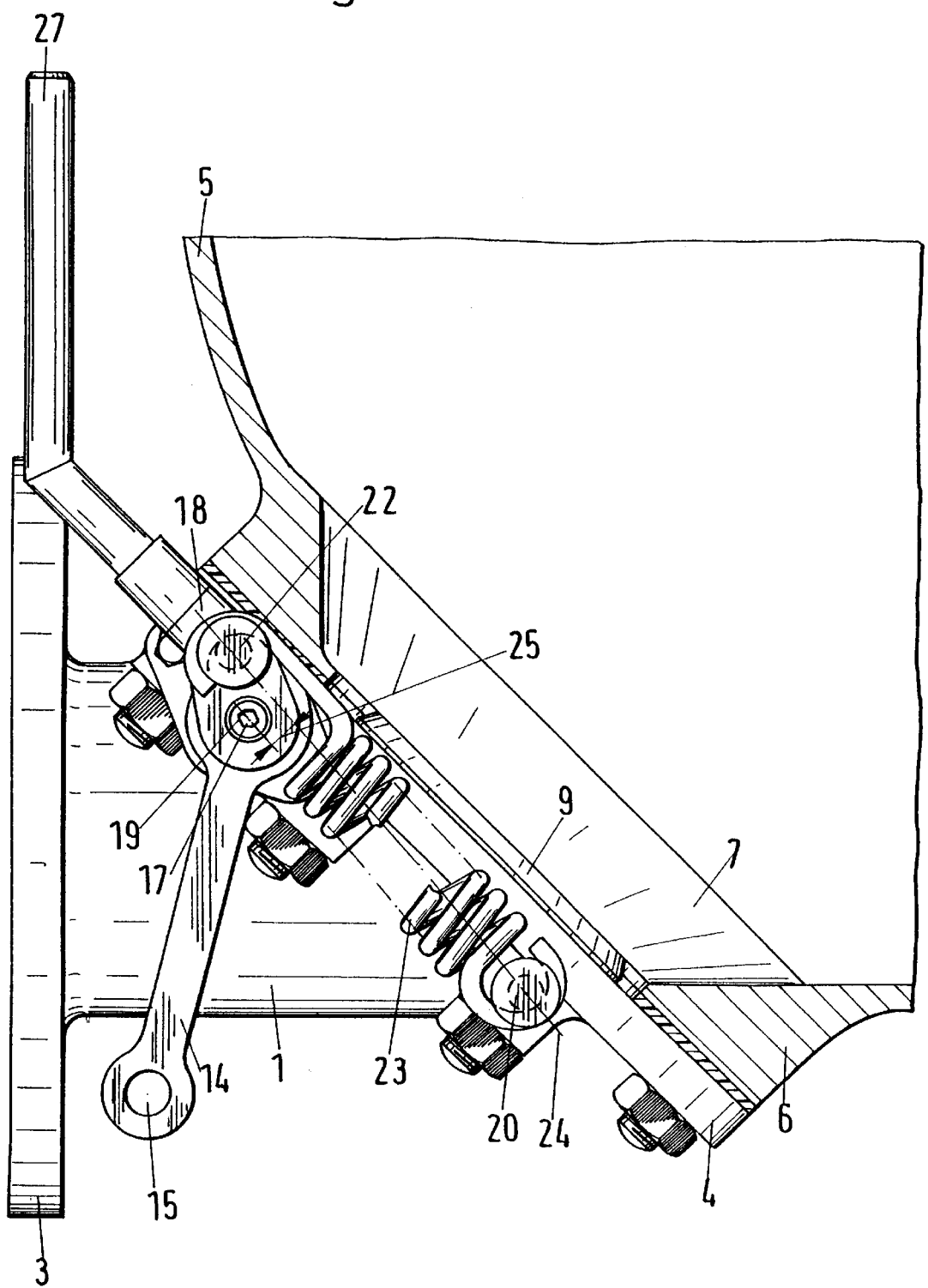
FIG. 4 is a right side elevational view of the shutoff valve in the closed position.
Figure 5:
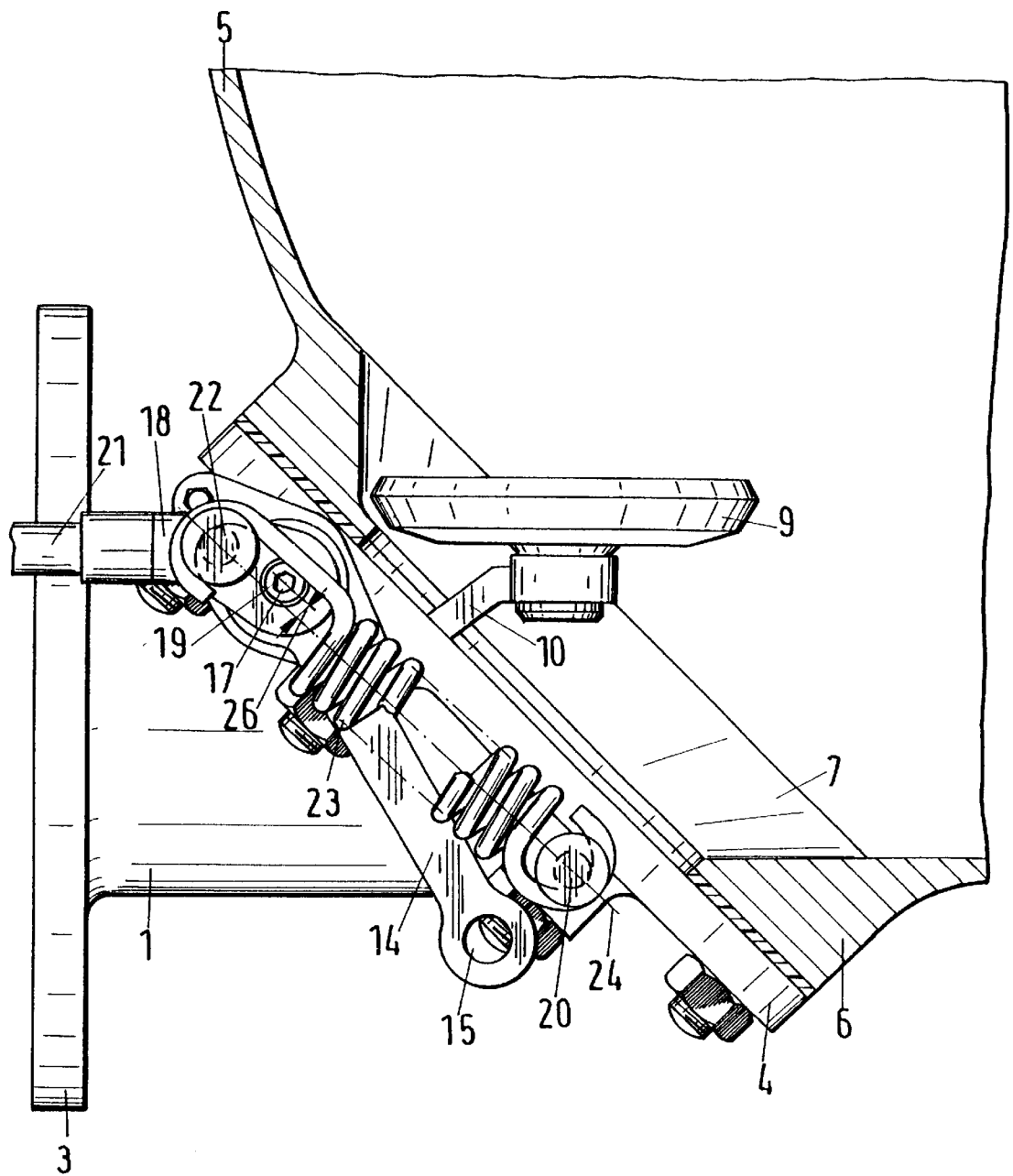
FIG. 5 is another right side elevational view of the shutoff valve in the open position.

Arm 18 extends transversely to a longitudinal axis 17 of actuating shaft 11, in a direction away from an abutment 20, which is mounted on the outside of valve housing 1. At the end of arm 18, remote from actuating shaft 11, an actuating lever 21 extends outwardly. Actuating lever 21 permits manual opening and closing of the shutoff valve. Swinging arm 18 also includes a driver 22 at the end remote from valve housing 1 and the actuating shaft 11. Driver 22 engages one end of a tension spring 23 located outside of valve housing 1. The other end of spring 23 is supported on abutment 20. Abutment 20 and driver 22 are arranged so that tension spring 23 is positioned laterally adjacent flange 4 when viewed from the front, in FIG. 2. It should be noted that FIG. 2 only shows the right side of actuation shaft 11 in cross section. Valve disk 9 and pivoting lever 10 are all shown in elevation to enhance the disclosure of the relationship between these parts. The longitudinal direction and the linear direction of movement of tension spring 23 extend transversely to longitudinal shaft axis 17, which can also be seen in FIG. 2. An imaginary connecting line 24 extends between abutment 20 and driver 22 with a first lateral displacement 25 and a second lateral displacement 26 relative to shaft axis 17, as can be seen in FIGS. 4 and 5, respectively. Tension spring 23 exerts its force along connecting line 24. In the closed position of valve disk 9, displacement 25 extends radially from axis 17 in the direction that driver 22 pivots when the shutoff valve is closing, as can be seen in FIG. 4. In the open position of valve disk 9, displacement 26 extends radially from axis 17 in the direction that driver 22 pivots when the shutoff valve is opening, as can be seen in FIG. 5.

In the assembly of the shutoff valve, after valve disk 9 and actuating shaft 11 have been installed in valve housing 1, pin 16 of swinging arm 18 is loosely inserted into receiving bore 13, and screw 19 is loosely screwed in. Actuating lever 21 is subsequently swiveled in the opening direction so that tension spring 23 can be readily installed on abutment 20 and driver 22. Valve disk 9 is then pressed against valve seat 8. This can be accomplished directly by manually pressing valve disk 9, or indirectly by pivoting closing lever 14. Lever 14 is torsionally rigidly connected with actuating shaft 11 in the clear space between valve housing 1 and arm 18. Actuating lever 21 is then moved into the closed position until displacement 25, corresponding to the closed position has been reached. In this position, screw 19 is tightened so that actuating shaft 11 and swinging arm 18 are torsionally rigidly connected with each other. The cone connection permits a continuous adjustment between the two parts, and tensioning and relieving of tension spring 23 is particularly simple as well.

In the closed position, as shown in FIG. 4, tension spring 23, due to displacement 25, exerts a torque on actuating shaft 11 in the closing direction. This torque results in a closing force acting on valve disk 9, which seals it against valve seat 8. The filling and draining opening 7 of container 5 is therefore reliably sealed. No additional locking or arresting mechanism is required to maintain valve disk 9 in the closed position.

For opening the shutoff valve, actuating lever 21 is pivoted in the opening direction, which increases the force of tension spring 23. At the same time, however, displacement 25 decreases constantly, and due to the decreasing displacement, the torque acting on actuating shaft 11 in the closing direction also decreases. Once displacement 25 reaches zero, the torque becomes zero as well. At this point, the valve disk is in the partly open position. When actuating lever 21 is pivoted further, displacement 26 is established which extends in the opposite direction. Displacement 26 causes a torque on actuating shaft 11 in the opening direction. This is combined with a reduction of the force of tension spring 23, with the result that valve disk 9 is snapped instantaneously from the partly-open position into the fully-open position, where it remains, as can be seen in FIG. 5. Filling or draining of container 5 can now take place without additional locking or arresting mechanisms being required.

For closing, actuating lever 21 is moved against the increasing force of tension spring 23 in the closing direction until displacement 26 is eliminated, and displacement 25 in the opposite direction develops. The reduction in the force of tension spring 23 occurring in this connection, and the increasing closing moment of actuating shaft 11 results in a sudden closing of the shutoff valve. Instead of closing the valve directly by hand via actuating lever 21, a rip cord may be connected with eye 15 of closing lever 14 for remote operation. When the rip cord is pulled, closing lever 14 swings from the open position into the closed position, and eye 15 simultaneously moves from its position close to container 5, shown in FIG. 5, into its position remote from container 5.

The shutoff valve according to FIG. 6 has a pressure spring 27 instead of a tension spring, which is clamped between abutment 20 on the housing side and driver 22 on arm 18. Arm 18, at its end remote from shaft 11 onto which driver 22 is arranged, extends in a direction toward abutment 20. On this shutoff valve as well, the imaginary connecting line 24 between abutment 20 and driver 22 has a first displacement 25 and a second displacement 26 relative to axis 17. The actuation and function of the embodiment shown in FIG. 6 is in all respects equivalent to the description provided above. Closing lever 14, shown in FIGS. 2 to 5, adapted for remote actuation can also be fitted on the shutoff valve according to FIG. 6. With the shutoff valves according to the invention, it is also possible to dispense with closing lever 14 if desired. In cases where actuating lever 21 is removed, adjusting and actuating the valve is possible by placing a wrench on polyhedral 12 of actuating shaft 11.

The externally disposed tension spring 23 or pressure spring 27 is always easily visible. Therefore, any damage to the spring can be seen immediately. Also, when selecting the material for either spring 23 or 27, it is not necessary to take into account corrosive properties of the medium in the container, if any. This means that a favorably priced and yet tested material can be used for the spring. All this is highly advantageous to the operational safety of the shutoff valve. All operating parts are arranged in the zone of the housing adjoining the flange 4 (the preconditions for this are set by arranging the tension spring 23 or pressure spring 27 outside of the circumference of the flange). Only within the zone, valve housing 1 has to be designed for receiving or supporting the operating elements. The entire remaining part of the housing only forms the flow-through duct 2 and the walls can be designed accordingly, so that a valve housing of a particularly light weight is obtained.

Accordingly, while only several embodiments of the present invention have been shown and described, it is obvious that many changes and modifications may be made thereunto without departing from the spirit and scope of the invention.

What is claimed is:

1. A shutoff valve including a valve housing having an end with a flange for connection to a container and a wall defining a flow-through duct with a valve seat comprising:

a pivoting valve disk cooperating with the valve seat to open and shut the shutoff valve;

an actuating shaft located close to said flange with a longitudinal axis extending through the wall of the valve housing and being connected to said valve disk within the valve housing;

a pivoting arm mounted on said actuating shaft outside the valve housing and extending transversely to the longitudinal axis, said pivoting arm having an end remote from said actuating shaft with a driver disposed at said end;

a stationary abutment formed on an outer side of the valve housing close to said flange;

a spring disposed laterally adjacent said flange for rotating said actuating shaft connected to said stationary abutment and said driver outside the valve housing along a linear direction of movement that extends transverse to the longitudinal axis; and actuating means disposed outside of the valve housing and engaging said actuating shaft for pivotal movement about the longitudinal axis;

wherein said driver and said abutment are positioned so that when the valve is shut, a connecting line extends between said abutment and said driver which is laterally displaced from the longitudinal axis in the direction of shutting the valve.

2. The shutoff valve according to claim 1, wherein said driver and said abutment are positioned so that when the valve is open, the connecting line is laterally displaced from the longitudinal axis in the direction of opening the valve.

3. The shutoff valve according to claim 2, wherein said end of said pivot arm extends away from said abutment and said spring exerts tension between said driver and said abutment.

4. The shutoff valve according to claim 2, wherein said end of said pivot arm extends toward said abutment and said spring is compressed between said driver and said abutment.

5. The shutoff valve according to claim 1, comprising:
  a first conical part comprising a conical pin;
  a second conical part comprising a complementary conical receiving bore, wherein one conical part is disposed at an end of said actuating shaft outside of the valve housing and the other conical part is disposed on said pivoting arm; and
  clamping means for pressing said conical parts into each other to secure said pivoting arm to said actuating shaft.

6. The shutoff valve according to claim 2, wherein said actuating means comprises a lever mounted onto said pivoting arm.

7. The shutoff valve according claim 2, wherein said actuating shaft includes engagement surfaces outside of the valve housing adapted to engage pivoting means.

8. The shutoff valve according to claim 7, comprising pivoting means mounted to said engagement surfaces for pivoting said actuating shaft.

9. The shutoff valve according to claim 7, wherein said pivoting arm is connected to said actuating shaft spaced from the valve housing with said engagement surfaces disposed between the valve housing and said pivoting arm.

10. The shutoff valve according to claim 2, wherein the valve seat is located at said end of the valve housing.

* * * * *